Feb. 20, 1973 R. S. MEYER 3,716,928
VOCATIONAL GUIDANCE AIDS

Filed April 5, 1972         2 Sheets-Sheet 2

```
┌─────────────────────┐
│        SELF         │
│                     │
│    I like working   │
│    with numbers.    │
│                     │
│                     │
│                     │
│    (Computational   │
│      Interests)     │
│                 SU1 │
└─────────────────────┘
```
— 16

*Fig. 2*

```
┌─────────────────────┐
│     WORK WORLD      │
│                     │
│   I can see myself  │
│   in work requiring │
│ the ability to recognize │
│   similarities and  │
│ differences in colors. │
│                     │
│       (Color        │
│    Discrimination)  │
│                 WW1 │
└─────────────────────┘
```
17 —

*Fig. 3*

```
┌─────────────────────┐
│     PLAN-PREP       │
│                     │
│    I plan to take   │
│  a "General" course │
│    in high school.  │
│                     │
│                     │
│                     │
│   (General Course)  │
│                 PP1 │
└─────────────────────┘
```
— 18

*Fig. 4*

```
┌─────────────────────┐
│     AVOCATION       │
│                     │
│   As an employed    │
│     adult, I will   │
│   enjoy camping     │
│   in my leisure     │
│        time.        │
│                     │
│      (Camping)      │
│                 Av  │
└─────────────────────┘
```
19 —

*Fig. 5*

```
┌─────────────────────┐
│    VOC. IDENTITY    │
│                     │
│     I can see       │
│  myself in accounting. │
│                     │
│                     │
│                     │
│                     │
│     (Accounting)    │
│                 VI  │
└─────────────────────┘
```
— 20

*Fig. 6*

```
┌─────────────────────┐
│        SELF         │
│                     │
│    Persons need to  │
│   be recognized as  │
│   having dignity and │
│       worth.        │
│                     │
│                     │
│  (Dignity and Worth) │
│                SU 5 B │
└─────────────────────┘
```
21 —

*Fig. 7*

United States Patent Office 3,716,928
Patented Feb. 20, 1973

3,716,928
VOCATIONAL GUIDANCE AIDS
Robert S. Meyer, 475 Presidential Lane,
Madison, Wis. 53711
Filed Apr. 5, 1972, Ser. No. 241,365
Int. Cl. G09b 19/00
U.S. Cl. 35—22 R
1 Claim

ABSTRACT OF THE DISCLOSURE

A vocational guidance aid which may be played as a group game or used as an individual counseling tool. The aid has a plurality of information cards and at least one board with defined card receptacle spaces arranged in pyramiding fashion with the first choice vocational career at the pinnacle. The cards carry various information on personal, work world, and planning and preparation factors that affect ones decision on a vocation. The cards are selected by the individual and placed on the board spaces to which they are coded to build a foundation for a vocational choice.

BACKGROUND OF THE INVENTION

This invention relates generally to the field of educational materials and more particularly to an instructional aid which may be used on an individual basis or as a group game for assisting the participants in making educational, avocational and vocational decisions.

SUMMARY OF THE INVENTION

The invention basically is a vocational guidance aid which may be played by a group as an interesting and thought-provoking game during which the participants become aware of the many personal and work world factors and planning and preparation consideration which should go into the choosing of ones vocation. It makes a particularly good game for family groups, young people in junior and senior high schools, adults about to return from military to civilian life, adults in need of retraining due to suffering disabilities or displacement from their jobs, adults about to return from institutional life to society, and counselors in training.

The invention also is particularly useful as a counseling tool for parents, school counselors, military service counselors, rehabilitation counselors, employment counselors, institutional counselors and clergymen in working with the aforementioned persons.

An individual using the aid alone or with counsel gains an awareness of the many factors, personal and otherwise, which should be considered in making educational, avocational and vocational decisions.

The board has defined card receptacle spaces arranged in triangular fashion with a first choice vocational career card space at the apex. Below that and forming a basis and broad foundation for the vocational career choice are a plurality of additional card receptacle spaces. Informational cards coded to each particular space are selected from groups of cards and placed on the card spaces in an effort to build a basis for a decision on a vocational career.

BRIEF DESCRIPTION OF THE DRAWINGS

FIG. 2 is a plan view of a representative sample of a self-understanding information card.

FIG. 3 is a plan view of a representative sample of a work world information card.

FIG. 4 is a plan view of a representative sample of a planning and preparation information card.

FIG. 5 is a plan view of a representative sample of an avocational choice information card.

FIG. 6 is a plan view of a representative sample of a vocational identity information card.

FIG. 7 is a plan view of a representative sample of a bonus card on which is printed a career development concept.

DESCRIPTION OF A PREFERRED EMBODIMENT

Figure 1:
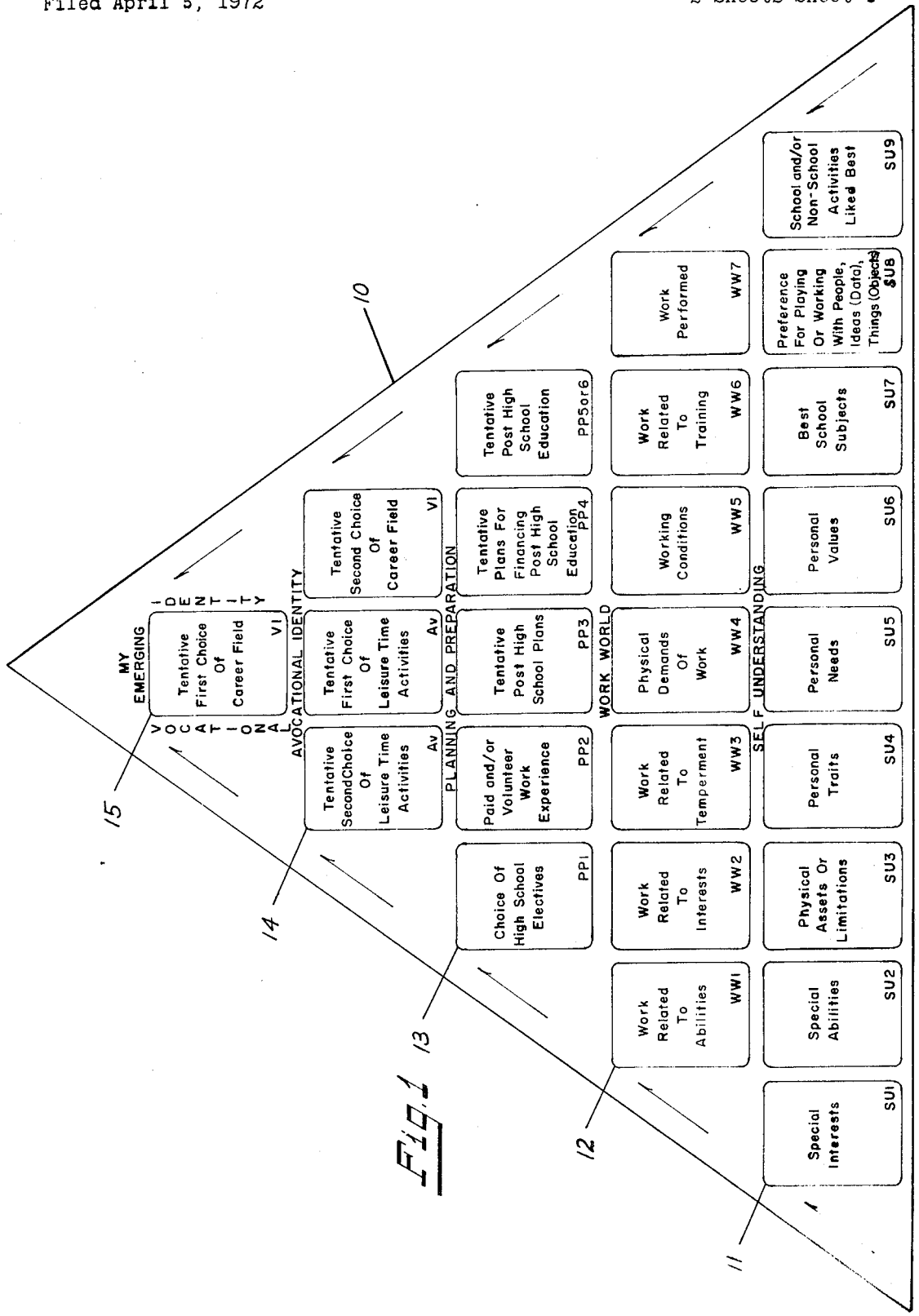
FIG. 1 is a plan view of the board for my vocational guidance aid.

Referring now more particularly to the drawings, each player or individual using the aid has a board shown generally at 10 in FIG. 1. As shown therein, the board is generally flat and has a plurality (25 shown) of defined card receptacle spaces arranged in a generally triangular pattern comprising a series of five horizontally extending lines. The card receptacle spaces may be printed on the board as shown in FIG. 1 or they may be defined by recessing them slightly for receiving the cards if desired.

The lowermost line 11 of card receptacle spaces is comprised of nine "Self-Understanding" spaces labeled and coded as follows:

Special Interests, SU1
Special Abilities, SU2
Physical Assets or Limitations, SU3
Personal Traits, SU4
Personal Needs, SU5
Personal Values, SU6
Best School Subjects, SU7
Preference for Playing or Working with People, Ideas (Data), or Things (Objects), SU8
School and/or Non-School Activities Liked Best, SU9

The fourth line of spaces from the top which is designed 12 in FIG. 1 has seven card receptacle spaces labeled and coded as follows:

Work Related to Abilities, WW1
Work Related to Interests, WW2
Work Related to Temperment, WW3
Physical Demands of Work, WW4
Working Conditions, WW5
Work Related to Training, WW6
Work Performed, WW7

Above the "Self Understanding" and "Work World" foundation lines is a third line of card receptacle spaces designated 13 in FIG. 1 comprising five "Planning and Preparation" card receptacle spaces labeled and coded as follows:

Choice of High School Electives, PP1
Paid and/or Volunteer Work Experience, PP2
Tentative Post High School Plans, PP3
Tentative Plans for Financing Post High School Education, PP4
Tentative Post High School Education, PP5 or 6

The second line of spaces from the top designated 14 in FIG. 1 has three card receptacle spaces, the first two of which are "Avocational Identity" spaces labeled and coded as follows:

Tentative Second Choice of Leisure Time Activities, Av
Tentative First Choice of Leisure Time Activities, Av The topmost line of spaces designated 15 in FIG. 1 comprises a single card receptacle space which together with the third space of said second line constitute "Vocational Identity" spaces labeled and coded as follows:
Tentative Second Choice of Career Field, VI
Tentative First Choice of Career Field, VI The device includes at least twenty-four groups of information cards of substantially the same size and shape as the defined card receptacle space printed on the board. Each card has a heading across the top to indicate whether it is a Self-Understanding (SELF), Work World (WORK WORLD), Planning and Preparation (PLAN-PREP), Avocational Identity (AVOCATION), or Vocational Identity (VOC IDENTITY) card; a short sentence; key word(s) in parentheses toward the bottom; and a code in the lower right hand corner to assure its proper placement on the playing board. As examples:

The information card 16 shown in FIG. 2 is representative of nine groups of "Self-Understanding" cards. The particular card shown carries the indicia SU1 coding it to the first space in the lowermost line 11 also coded SU1. There are a plurality of cards coded SU1 which constitute the first group of cards all of which carry sentence information relating to "Personal Special Interests." Each card in the second group of cards is coded SU2 carrying sentence information relating to "Special Abilities." Each card in the third group of cards is coded SU3 and carries sentence information relatin to "Physical Assets or Limitations." Each card in the fourth group of cards is coded SU4 and carries sentence information relating to "Personal Traits." Each card in the fifth group of cards is coded SU5 and carries sentence information relating to "Personal Needs." Each card in the sixth group of cards is coded SU6 and carries sentence information relating to "Personal Values." Each card in the seventh group of cards is coded SU7 and carries sentence information relating to "Best School Subjects." Each card in the eighth group of cards is coded SU8 and carries sentence information relating to a "Preference for Playing or Working with People, Ideas (Data), Things (Objects)." Each card in the ninth group of cards is coded SU9 and carries sentence information relating to "School and/or Non-School Activities Liked Best."

The information card 17 shown in FIG. 3 is representative of seven groups of "Work World" cards. The particular card shown here carries the indicia WW1 coding it to the first space in the fourth line of spaces 12 also coded WW1. There is a plurality of cards coded WW1 which constitutes the tenth group of cards which carry sentence information concerning "Work Related to Abilities." Each card in the eleventh group of cards is coded WW2 and carries sentence information concerning "Work Related to Interests." Each card in the twelfth group of cards is coded WW3 and carries sentence information concerning "Work Related to Temperment." Each card in the thirteenth group of cards is coded WW4 and carries sentence information concerning "Physical Demands of Work." Each card in the fourteenth group of cards is coded WW5 and carries sentence information concerning "Working Conditions." Each card in the fifteenth group of cards is coded WW6 and carries sentence information concerning "Work Related to Training." Each card in the sixteenth group of cards is coded WW7 and carries sentence information concerning "Work Performed."

The information card 18 shown in FIG. 4 is representative of six groups of "Planning and Preparation" cards. The particular card shown carries the indicia PP1 coding it to the first space in the third line of spaces 13. There is a plurality of cards coded PP1 which constitutes the seventeenth groups of cards which carry sentence information relating to "Choice of High School Electives." Each card in the eighteenth group of cards is coded PP2 and carries sentence information relating to "Paid and/or Volunteer Work Experience." Each card in the nineteenth group of cards is coded PP3 and carries sentence information relating to "Tentative Post High School Plans." Each card in the twentieth group of cards is coded PP4 and carries sentence information relating to "Tentative Plans For Financing Post High School Education." Each card in the twenty-first group of cards is coded PP5 and carries sentence information relating to "Tentative Post High School Education" in a vocational-technical school or junior college. Each card in the twenty-second group of cards is coded PP6 and carries sentence information relating to "Tentative Post High School Education" in a four-year college.

The information card 19 shown in FIG. 5 is representative of a single group of "Avocation" cards. The cards in this group carry the indicia Av coding them to the first two spaces in the second line of spaces 14 and carry sentence information realting to choices of leisure time activities.

The information card 20 shown in FIG. 6 is representative of a single group of "Vocational Identity" cards. The cards in this group carry the indicia VI coding them to the correspondingly coded spaces in the first and second lines of spaces on the board. All of these cards carry sentence information relating to choices of career fields.

The information card 21 shown in FIG. 7 is representative of a plurality of bonus cards which are shuffled in with the "Self-Understanding," "Work World," and "Planning and Preparation" cards. These cards carry the indicia "B" in addition to the regular code for the self-Understanding, Work World, and Planning and Preparation cards.

Playing instructions (for group play with three to six players)

(1) Shuffle all SU1 through SU8 cards together and place them face down on the table. (SU9 cards are left separate.)

(2) Shuffle WW1 through WW6 cards together and place them face down on the table. (WW7 cards are left separate.)

(3) Shuffle all PP1 through PP4 cards together and place them face down on the table. (PP5 and PP6 decks are left separated.)

(4) Also, leave Av and VI decks separated.

(5) Issue each player a triangular playing board.

(6) To determine starting player, all players draw a card from the SU1–8 deck. Player drawing highest number plays first. If there are ties, those drawing the same highest number will draw again to break the tie. Cards drawn are then shuffled back into the deck.

(7) The object of the game is to build a description of a fictitious person on your playing board with cards from the nine decks of descriptive miniature playing cards. Cards are drawn by chance from three of the decks (SU1–8, WW1–6, and PP1–4) and are selected by choice from the remaining decks (SU9, WW7, PP5 or 6, Av, and VI). The first player to cover all spaces on his board is declared the winner.

(8) To start play, the first player draws the top card from the turned down SU1–8 deck, reads it aloud, and places is over the appropriate space on his board. For example, if he turns up a card coded SU4, he places it over the SU4 Personal Traits space on his board. Each player continues in same manner, taking turns in a clockwise direction around the table.

(9) As players take their turns, they may find the card they turn up has the same code in the lower right corner as one they have already placed on their board. They then have two options, either to place the newly drawn card face up next to the SU1–8 deck, or to exchange it with the one on their board and place the previously drawn card face up next to the same deck. (Exchanges are made when a player decides the newly drawn card would go better with the other cards placed on his board.) Players must then wait until their next turn before drawing another card.

(10) Once cards have been discarded face up next to the turned down deck, a player may choose to take the top discarded card instead of drawing from the turned down deck—to cover an empty space on his board or to exchange it for a previously drawn card.

(11) Also, as players take their turns, they may draw a bonus card (coded "B" in lower right hand corner). After reading aloud the career development concept printed on the bonus card, they should set it aside for later use and draw another card immediately (within same turn).

(12) Players will cover their SU1 through SU8 spaces at different rates according to the number of times they turn up cards for spaces already covered. The next turn after a player covers the last of his SU1 through SU8 spaces, he may cash in his bonus cards. For each bonus card accumulated, he may draw two cards from the turned down deck and use them as substitutes if needed to create a consistent fictitious model. The unused cards and bonus cards are then mixed into the discard pile on the table.

However, if he is satisfied with the cards drawn, he is not required to use this turn to cash in bonus cards. Instead, he may proceed to selecting his SU9 activity card (see next step).

(13) In his next turn, each player is given an opportunity to sort through the SU9 deck to select an activity card that he believes would go best with the other "Self" cards on his board.

(14) After following instructions 8 through 12 for the WW1–6 cards, each player is given an opportunity in his next turn to sort through the WW7 deck to select a work performed card that would fit in with the previously drawn cards on his board.

(15) Instructions 8 through 11 are again followed for PP1 through PP3 spaces. If a PP3 post high school plans card is drawn indicating no plans for post high school education, none of the PP5 and PP6 cards will be used; and if not already drawn, the PP4 space need not be covered. However, if the PP3 card does indicate plans for further education beyond high school, the same procedure is carried out to cover space PP4.

(16) If desired, each player may use his next turn to exchange bonus cards to obtain a logical combination of planning and preparation cards in line with the previous drawings of self understanding and work world cards. If he does not want to use a turn to cash in bonus cards, he may go directly to next step.

(17) Next, each player is given an opportunity to choose a card from either the PP5 or PP6 deck to represent the tentative post-high school training and education he believes his fictitious model would want. (PP5 cards pertain to private or public vocational, technical, or junior college training. PP6 cards pertain to private or public college or university majors.)

(18) Finally, after one of the players has covered all self-understanding spaces, all work world spaces, and all necessary planning and preparation spaces, he is given an opportunity to select a first and second choice from the Av deck to cover his avocational identity spaces in one turn; and in his next and last turn, he selects two cards from the VI deck to represent his fictitious model's first and second choices of career fields.

(19) The first player to have completed the steps outlined above is declared the winner of the game. However, his fellow players may challenge his choice of avocational and vocational identity cards as not being valid in relation to the rest of the cards on his board. He, in turn, can justify his selections through discussion and/or reference to resource materials available in his guidance resource center. If, after discussion, the majority of players agree with his choices, he is confirmed the winner; if not, he must pick up the cards declared invalid and wait his next turn to try again.

(20) In order to share the descriptions and concepts printed on each card with the other players, it is important that each player read aloud the short sentence on his card as he places it on his playing board.

(21) If a player draws from the wrong deck by mistake, he returns the card to the bottom of the turned down deck and loses that turn.

(22) To keep the game moving, it is recommended that as soon as a player is eligible to select cards from the SU9, WW7, PP5 or 6, Av and VI decks, he starts sorting through these decks immediately without waiting his turn. The other players can continue playing one turn while he is sorting and then wait for him to complete his selection before taking a second turn.

Playing Instructions (for solitare play with or without a counselor)

(1) Stack all cards over their correct spaces on one playing board, per codes in lower right corners. (Since PP5 and PP6 cards are used on the same space, one of these decks will be set next to the space while the other covers it.)

(2) Starting with the SU1 stack and working across the board through the SU9 stack, select three cards in each group that best describe you as you see yourself. (While you will have several interests, abilities, traits, needs, etc., you should select the three most appropriate for you.) Then rank these three cards and place the three of them over their coded space on a second playing board, with your first choice on top. (As you sort through each stack, you will come across a few bonus career development concept cards. Read these and replace them in their stack on the first board.)

(3) Next, proceed to the Work World cards and start selecting cards from the stacks on the first board, WW1 through WW7, that best describe the kind of work situations for which you think you could qualify and in which you could see yourself as an adult. As above, first select the top three, then rank these and place them over their coded spaces on your second board with first choice on top.

(4) Follow the same procedure with the Planning and Preparation cards. However, if your post high school plans do not include further education, you can skip the PP4 through PP6 stacks. Also, if you do plan to continue your education, select the training cards from either the PP5 deck for one and two year private or public vocational, technical, or junior college programs or the PP6 deck for majors at four year private or public colleges or public colleges or universities.

(5) At this point, look over the cards you have placed on your second board. Do they give you an accurate picture of yourself in relation to the world of work? Are your tentative plans realistically based on your acquired knowledge of self and the world of work? Before going on, make final adjustments in your selections until you are satisfied.

(6) Next, sort through the Av cards and select first and second tentative choices of avocations; and place these two cards over the two spaces provided on your second board.

(7) Finally, sort through the Vocational Identity cards and select a first and second tentative choice of career fields; and place them over the two spaces provided.

(8) The avocational and vocational identity cards chosen should be logical outcomes based on the previous card selections. To verify the leisure time activites and career fields are realistic possibilities that should be given serious consideration, it is recommended that you go to your guidance resource center to secure more details about each of them. It is also recommended, if at all possible, that you talk with and observe people as they are performing in these avocations and vocations.

(9) After you have finished the entire game of solitaire, it is recommended that you keep a record of the key words appearing on the first, second, and third choice cards you selected.

It is understood that this invention is not confined to the particular construction and instructions herein illustrated and described, but embraces all such modified forms thereof as come within the scope of the following claim.

I claim:

1. A vocational guidance aid, comprising:
   (a) a generally flat board,
   (b) a plurality of defined card receptacle spaces arranged in a generally triangular pattern on said board in a series of five horizontal lines,
  (1) the lowermost line of said five lines having nine of said defined card receptacle spaces, each of said nine defined card receptacle spaces in said lowermost line carrying coded indicia one part of which is common only to each of said spaces in the lowermost line and part of which differentiates each of said spaces in said lowermost line from each other space in said lowermost line,
  (2) the fourth line from the top of said five lines having seven of said defined card receptacle spaces each of said seven defined card receptacle spaces in said fourth line carrying coded indicia one part of which is common only to each of said spaces in said fourth line and another part of which differentiates each of said spaces in said fourth line from each other space in said fourth line,
  (3) the third line from the top of said five lines having five of said defined card receptacle spaces, each of said five defined card receptacle spaces carrying coded indicia one part of which is common only to each of said spaces in said third line and another part of which differentiates each of said spaces in said third line from each other space in said third line,
  (4) the second line from the top of said five lines having three of said defined card receptacle spaces, two of said three spaces carrying coded indicia common only to both of said spaces, and
  (5) the topmost line of said five lines having one of said defined card receptacle spaces, said one space of said top line and said third space of said second line having coded indicia common only to both, and
(c) at least twenty-four groups of information cards of substantially the same size and shape as said defined card receptacle spaces,
  (1) each of the cards of nine of said groups having personal factor information thereon and further indicia coded to one card receptacle space in the lowermost line of said board,
  (2) each of the cards of seven of said groups having work world factor information thereon and further indicia coded to one defined card receptacle space in said fourth line of said board,
  (3) each of the cards of six of said groups having planning and preparation information thereon and further indicia coded to one defined card receptacle space in said third line of said spaces on said board,
  (4) each of the cards of one of said groups having avocational choices thereon and further indicia coded to said two defined card receptacle spaces said second line which have common coded indicia, and
  (5) each of the cards of one of said groups having vocational choices thereon and further indicia coded to the defined card receptacle space of said topmost line of spaces and to said third space of said second line of spaces having common coded indicia.

References Cited
UNITED STATES PATENTS

| | | | |
|---|---|---|---|
| 1,066,895 | 7/1913 | Flick | 273—152.4 |
| 1,073,786 | 9/1913 | Thomas | 273—135 B |
| 1,871,247 | 8/1932 | Trost | 273—135 B |
| 2,959,871 | 11/1960 | Honkavaara | 35—22 R |

WILLIAM H. GRIEB, Primary Examiner

U.S. Cl. X.R.

273—135 B, 152.4